US006644154B2

(12) United States Patent
Wierschke et al.

(10) Patent No.: US 6,644,154 B2
(45) Date of Patent: Nov. 11, 2003

(54) APPARATUS FOR TRANSVERSE CUTTING

(75) Inventors: Larry D. Wierschke, Green Bay, WI (US); Jeremy J. M. Papadopoulos, Green Bay, WI (US)

(73) Assignee: Paper Converting Machine Co., Green Bay, WI (US)

( * ) Notice: Subject to any disclaimer, the term of this patent is extended or adjusted under 35 U.S.C. 154(b) by 146 days.

(21) Appl. No.: 09/844,092

(22) Filed: Apr. 27, 2001

(65) Prior Publication Data

US 2002/0157513 A1 Oct. 31, 2002

(51) Int. Cl.[7] .......................... B26D 7/08; B23D 25/02; B24B 19/00

(52) U.S. Cl. ............................ 83/174; 83/327; 83/329; 451/419

(58) Field of Search ............................... 83/174, 471.1, 83/490, 329, 327; 451/419, 420

(56) References Cited

U.S. PATENT DOCUMENTS

| | | | | | |
|---|---|---|---|---|---|
| 82,257 | A | * | 9/1868 | Thompson | 83/471.1 |
| 1,424,875 | A | * | 8/1922 | Braun | 451/420 |
| 1,988,243 | A | * | 1/1935 | Johnson | 83/471.1 |
| 2,052,365 | A | * | 8/1936 | Stukart | 451/419 |
| 2,093,322 | A | * | 9/1937 | Lamoreaux | 83/34 |
| 2,116,248 | A | * | 5/1938 | Moser | 144/136.5 |
| 3,353,430 | A | * | 11/1967 | Brackmann et al. | 83/13 |
| 3,773,269 | A | * | 11/1973 | Brooks et al. | 241/282.1 |
| RE30,598 | E | | 5/1981 | Spencer | |
| 4,584,917 | A | * | 4/1986 | Blom | 140/105 |
| 5,315,907 | A | | 5/1994 | Biagiotti | |
| 5,557,997 | A | | 9/1996 | Wunderlich et al. | |
| 5,860,346 | A | * | 1/1999 | McKeegan et al. | 83/471.1 |
| 5,924,346 | A | | 7/1999 | Wunderlich et al. | |
| 6,092,450 | A | * | 7/2000 | Dueck | 83/174 |
| 6,123,002 | A | | 9/2000 | Wunderlich et al. | |

* cited by examiner

*Primary Examiner*—Allan N. Shoap
*Assistant Examiner*—Isaac N Hamilton

(57) ABSTRACT

The cutting blade of a continuous motion saw is mounted on a skew arm which rotates about an axis which is skewed relative to the path along which the product to be cut is advanced. The blade rotates about an axis which is parallel to the path. The blade orbits in a planetary manner to compensate for the skew angle and to ensure that the blade remains perpendicular to the path. Grinding stones for the blade are mounted radially inwardly of the blade throughout the entire orbit of the blade.

11 Claims, 8 Drawing Sheets

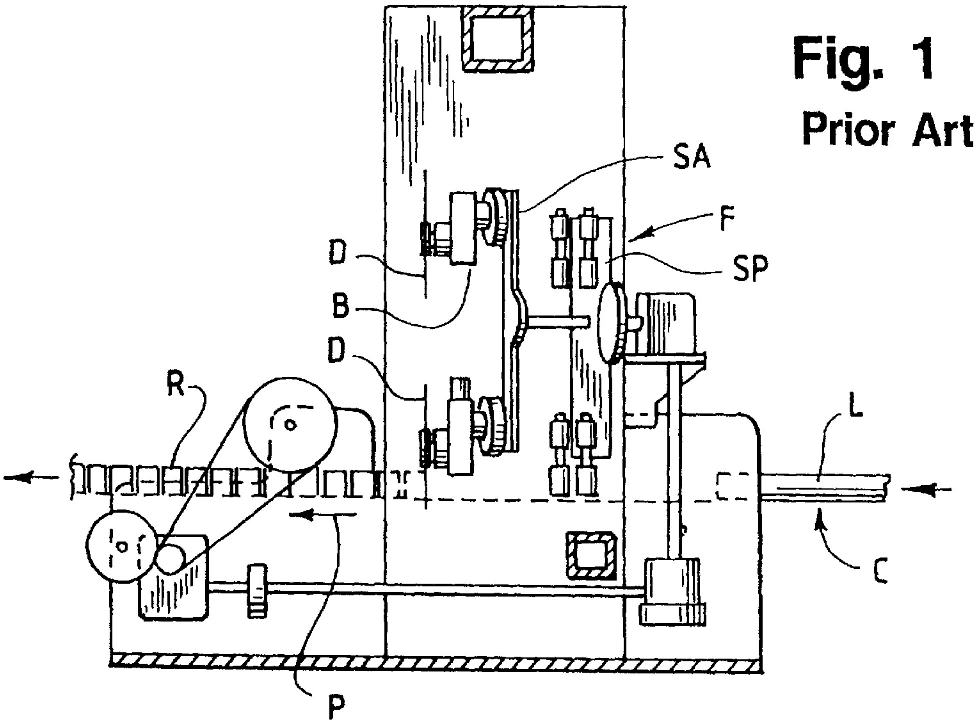
Fig. 1
Prior Art
Fig. 2 Prior Art
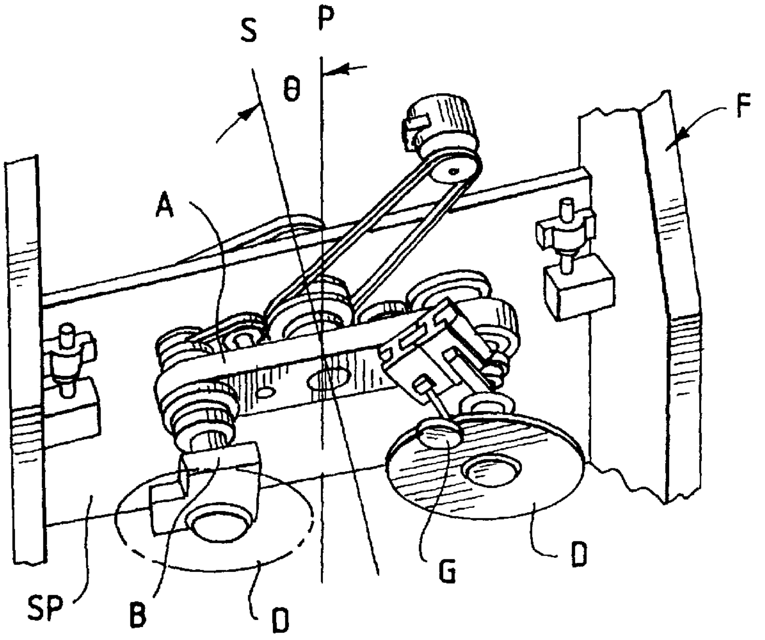

APPARATUS FOR TRANSVERSE CUTTING

BACKGROUND

This invention relates to a continuous motion orbital saw for transversely severing elongated multi-ply web material into shorter length products. More particularly, the invention relates to an orbital saw in which the cutting blade is mounted on a skew arm which rotates about an axis which is skewed relative to the path along which the elongated product is advanced. Compensation for the skew angle is accomplished by orbiting the blade in a planetary fashion so that the blade remains perpendicular to the path throughout the orbit. Grinding stones for sharpening the blade are positioned radially inwardly of the blade throughout the entire orbit.

A continuous motion saw is designed to cut a product in motion. Illustrative products are convolutely wound "logs" of bathroom tissue and kitchen toweling and bolts or continuous superposed plies of facial tissue.

There are a number of continuous motion saws which cut product that is in motion. The saw of U.S. Pat. No. Re. 30,598 uses a skew arm which rotates about an axis which is skewed with respect to the path along which the product is advanced. The disc blades for cutting the product are rotatably mounted on the skew arm so that the blades are perpendicular to the path. The supporting structures for the blades orbit in a planetary fashion about the skew axis to compensate for the skew angle so that the blades remain perpendicular to the path and make a square cut. The grinding stones for sharpening the blades also orbit with a planetary motion so that the grinding stones maintain the same relationship with the blades. However, the planetary motion of the grinders puts the grinders into completely reversing cyclic loading. The severe cyclic loading causes component fatigue and problems with grind quality as production speed increases.

In U.S. Pat. No. 5,315,907 the saw head is reciprocated parallel to the path of the product during its orbit. Although the grinding stones are mounted radially inwardly of the blade, all axes of motion are parallel.

U.S. Pat. Nos. 5,557,997, 5,924,346, and 6,123,002 describe a saw which uses a four bar linkage to orbit the blades rather than planetary motion. Eliminating planetary motion permits positioning the grinding stones radially inwardly of the blades. However, the four bar linkage is relatively complicated, and the preferred embodiment uses clutch means to maintain a constant forward index motion on internal components.

SUMMARY OF THE INVENTION

The invention uses planetary motion to compensate for the skew angle between the axis on which the skew arm rotates and the path of movement of the product. The planetary motion eliminates the need for clutch means since the components rotate at a continuous motion. In contrast to prior art saws with planetary motion, the grinding stones are positioned radially inwardly of the blade throughout the entirety of the blade orbit. Radially inwardly mounting the grinding stones is thereby accomplished without the complexity of the additional pivots and bars of the saws which use a four bar linkage.

One embodiment of the invention uses an angular differentiator to compensate for the skew angle. The angular differentiator is rotatably mounted on the skew arm and is driven in planetary fashion by a sun pulley and a planet pulley.

A second embodiment uses a self-aligning wobble bearing to compensate for the skew angle. The wobble bearing is mounted inside of the base for mounting the grinding stones.

A third embodiment uses intersecting axes in place of the angular differentiator. A kingshaft is rotatably mounted to the skew arm and extends perpendicularly to the skew axis. The base for mounting the grinding stones is pivotably mounted to the kingshaft parallel to the path of the product.

DESCRIPTION OF THE DRAWING

The invention will be explained in conjunction with illustrative embodiments shown in the accompanying drawing in which FIG. 1 is a schematic side elevational view of a continuous motion saw according to the prior art which uses planetary motion;

FIG. 2 is a fragmentary perspective view of the prior art saw of FIG. 1;

DESCRIPTION OF SPECIFIC EMBODIMENTS

Prior Art

Referring first to FIG. 1, the symbol F designates generally the frame of a saw which is described in U.S. Pat. No. Re. 30,598. As can be seen in FIG. 2, the frame includes a pair of side frames.

The frame F provides a path P which extends linearly and horizontally for the conveying of logs L and ultimately the severed rolls R. The logs and thereafter the rolls are conveyed along the path P by a suitable conveyor generally designated C. The symbol B designates generally the blade mechanism which includes two disc blades D—see also FIG. 2. As can be seen from FIG. 2, there is provided a bracket for each blade as at B which support the usual grinders G.

The blades D and their associated structure are carried by a skew plate SP which supports the skew arm A for rotation about a skew axis S which is arranged at a minor acute angle Θ to the path P (see the upper central portion of FIG. 2).

Figure 3:
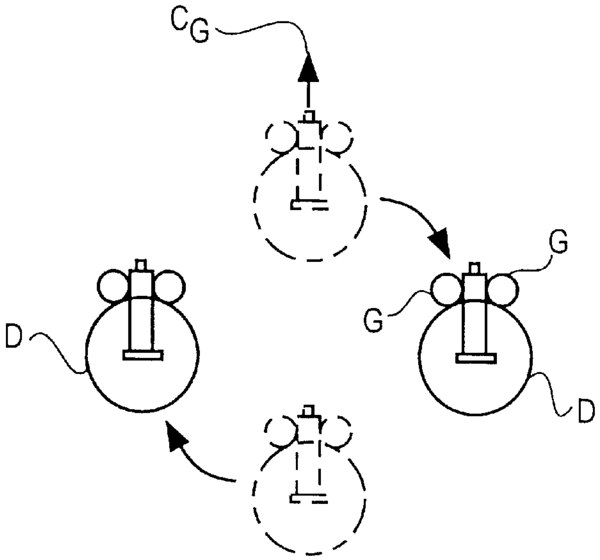
FIG. 3 PRIOR ART
FIG. 3 is a schematic view showing the orbiting of the blades and associated grinding stones of the prior art saw of FIG. 1.

FIG. 3 illustrates the orbiting of the disc blades D and the grinding stones G of the prior art saw of FIGS. 1 and 2. As described in U.S. Pat. No. Re. 30,598, the blades and the grinding stones orbit in planetary fashion and maintain the same relationship to the frame through the orbit. The grinding stones G are therefore always above the blades D. This results in a constantly changing force on the grinders. For example, at a planetary motion speed of 200 rpm the acceleration force $C_g$ due to centrifugal movement is 27.5 times "g".

Figure 4:
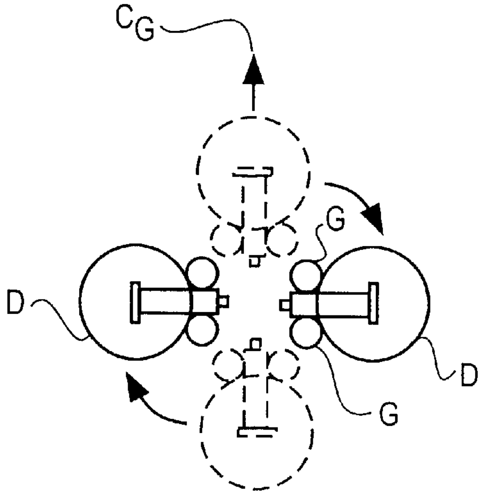
FIG. 4 PRIOR ART
FIG. 4 is a view similar to FIG. 3 showing the orbiting of the blades and grinding stones of a prior art saw which uses a four bar linkage.

FIG. 4 illustrates the orbiting of the disc blades D and grinding stones G of the prior art saw which is described in U.S. Pat. Nos. 5,557,997, 5,924,346, and 6,123,002. The grinding stones do not follow a planetary movement, and the grinding stones are always located radially inwardly of the blades. The grinding stones are always approximately the same distance from the orbit axis of the blades and the force $C_g$ is only 21.5 times "g" at a rotational speed of 250 rpm.

The Invention

A. FIG. 5

Figure 5:
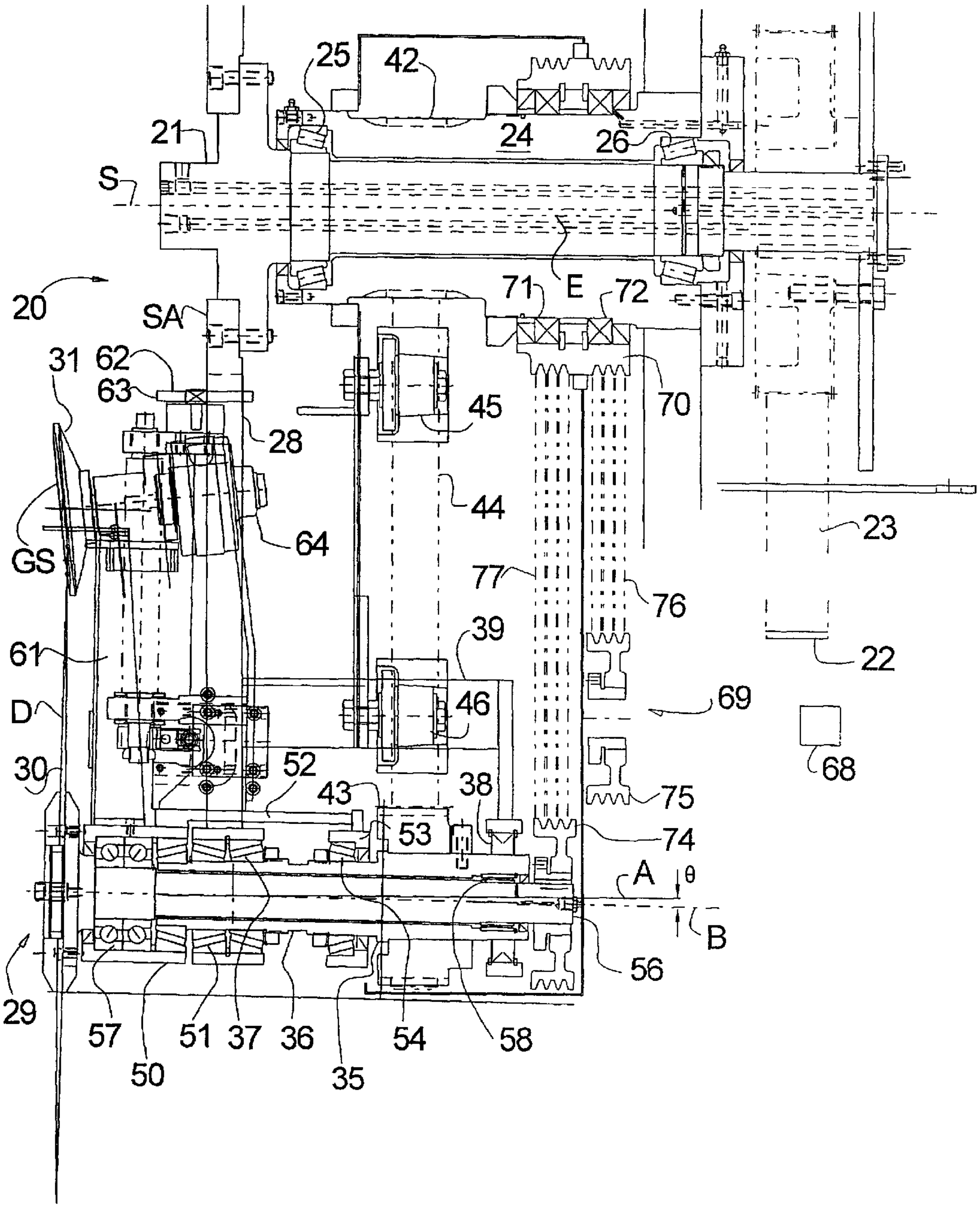
FIG. 5 is a fragmentary side elevational view of a continuous motion saw which is formed in accordance with the invention.

FIG. 5 illustrates a continuous motion saw 20 which includes a main drive shaft 21 which is rotatably mounted on a frame 22. The frame includes a skew plate 23 which supports a main bearing housing 24. Bearings 25 and 26 inside of the bearing housing rotatably support the main drive shaft 21 for rotation about an axis S which is skewed relative to the linear path P along which the product to be cut is advanced (see FIG. 1). The skew axis extends at a minor acute angle Θ relative to the path P.

A skew arm 28 is attached to the left end of the main drive shaft 21 and supports an orbit head assembly 29. The orbit head assembly includes a disc blade 30 and grinding stones 31. The invention will be explained with reference to a single disc blade and a single set of grinding stones. However, it will be understood that the saw could include two or more blades and associated sets of grinding stones.

Figure 6:
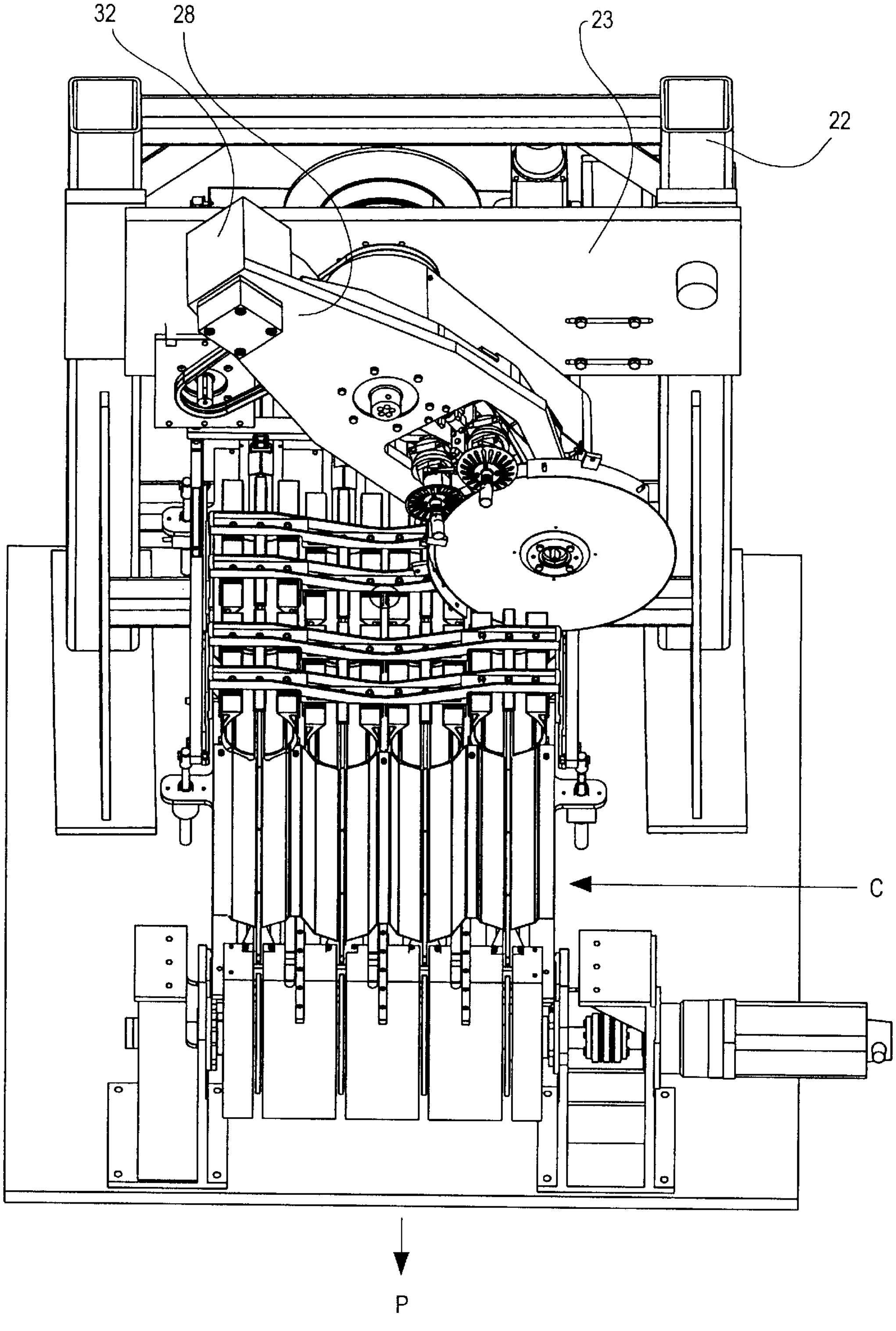
FIG. 6 is a perspective view of the saw of FIG. 5.

FIG. 6 illustrates the saw from the discharge end of the conveyor assembly C. A counterweight 32 is mounted on the skew arm 28.

Returning to FIG. 5, the orbit head assembly includes an angular differentiator 35 which is rotatably mounted on the skew arm 28 for rotation about an axis A which is parallel to the skew axis S. The angular differentiator includes a generally cylindrical housing 36 which is rotatably supported by bearings 37 and 38. Bearing 37 is mounted on the skew arm 28 and bearing 38 is mounted on bracket 39 which is attached to the skew arm. As the skew arm 28 is rotated by the main drive shaft 21, the angular differentiator 35 is caused to orbit in planetary motion by a sun pulley 42, a planet pulley 43, and a belt 44. The sun pulley 42 is formed as part of the stationary main bearing housing 24 and is concentric to the skew axis S. The planet pulley 43 is mounted on the angular differentiator and is concentric to axis A. The pulleys 42 and 43 and the belt 44 can be provided with teeth to prevent slippage. Tension on the belt 44 can be adjusted by belt tighteners 45 and 46 which are mounted on the skew arm. The sun pulley 42, planet pulley 43, and belt 44 could be replaced by equivalent mechanisms, for example, sprockets and a chain.

A generally cylindrical grinder base 50 is rotatably mounted on the left end of the angular differentiator by a bearing 51. The grinder base is also supported by an arm 52 which is attached to the grinder base and to a bearing housing 53 which is rotatably mounted on the middle of the angular differentiator by a bearing 54. The axial centerline of the grinder base is concentric to axis B, which is parallel to path P and remains so during the entirety of the orbit by virtue of the planetary motion of the angular differentiator.

An elongated blade arbor or shaft 56 is rotatably supported inside of the grinder base by bearings 57 and inside of the angular differentiator by bearing 58. The axis of the blade arbor is aligned with the axis B. The disc blade 30 is mounted on the left end of the blade arbor and extends in a plane which is perpendicular to the path P.

Figure 7:
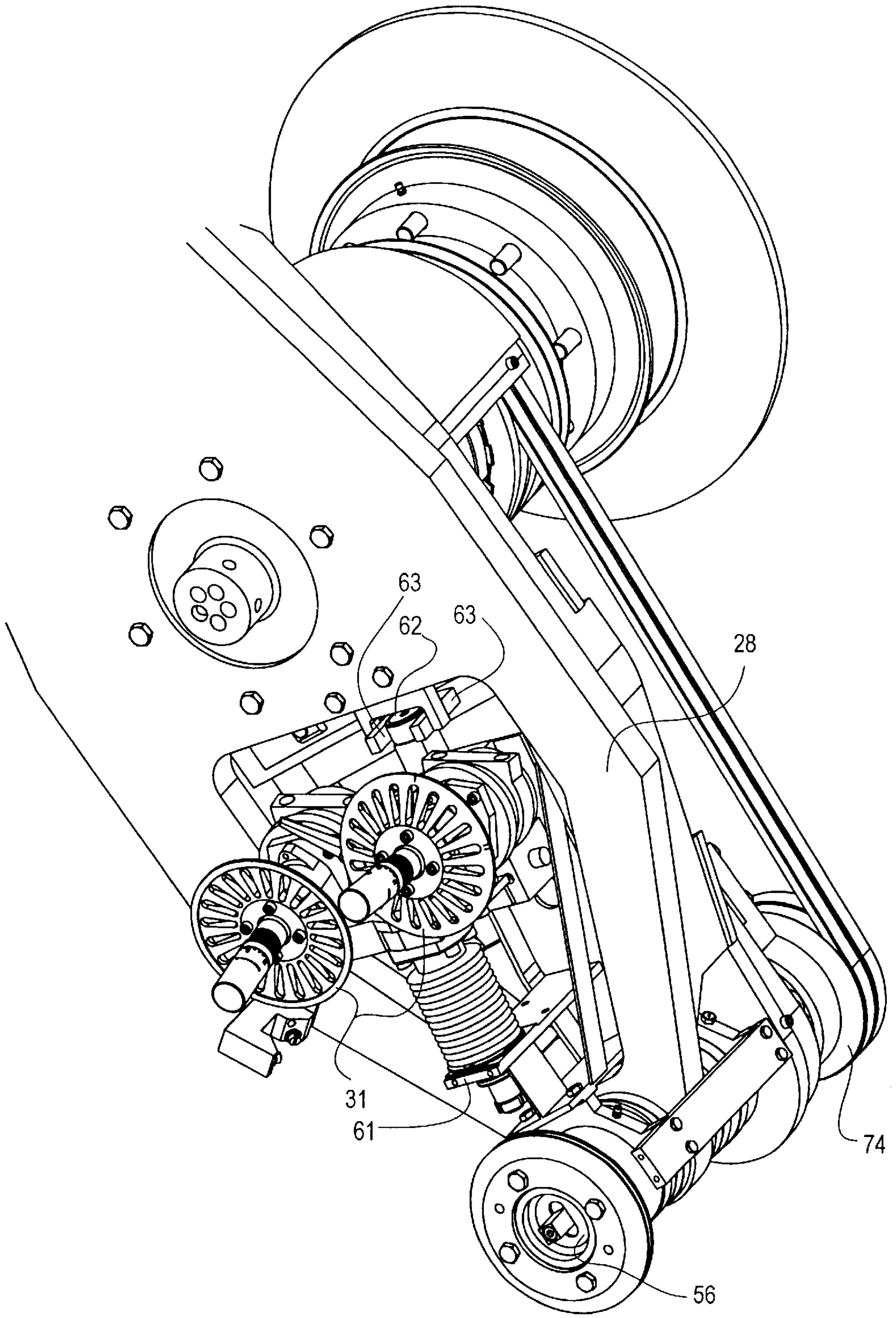
FIG. 7 is a fragmentary perspective view of the saw of FIG. 5.

A pair of grinding stones 31 are attached to the grinder base 50 by a support arm 61. The grinding stones are mounted radially inwardly of the blade and the grinder base, and a retaining guide 62 positions and holds the grinding stones radially inwardly throughout the orbit as it moves parallel to axis B within retainer arms 63 (see also FIG. 7) The retainer arms are attached to the skew arm 28. The grinding stones are driven by a conventional air motor 64 for sharpening the blade at the appropriate time during the cycle.

The disc blade 30 is driven by a blade drive motor 68 and an intermediate drive assembly 69. The intermediate drive assembly includes a pulley 70 which is rotatably mounted on the main bearing housing 24 by bearings 71 and 72. The pulley 70 is mounted on the main bearing housing so that the axis of rotation of the pulley is aligned with an axis E which is eccentric, i.e., offset and parallel, with respect to the skew axis S. The mount of eccentricity is dependent on the skew angle Θ in conjunction with the position of the intersection of the axes A and B.

The intermediate drive assembly 69 also includes a pulley 74 which is mounted on the right end of the blade arbor 56. A pulley 75 is mounted on the drive shaft of the blade drive motor 68 and is connected to the pulley 70 by belt 76. The pulley 70 is connected to the pulley 74 on the blade arbor by belt 77.

The planetary motion of the orbit head compensates for the skew angle and ensures that the disc blade 30 remains perpendicular to the path P throughout the orbit. Rotatably mounting the grinder base on the angular differentiator ensures that the grinding stones remain radially inwardly of the disc blade throughout the orbit. The distance between the grinding stones and the skew axis remains substantially constant throughout the orbit. Centrifugal forces on the grinding stones are thereby reduced, and cyclic loading is substantially eliminated.

B. FIG. 8

Figure 8:
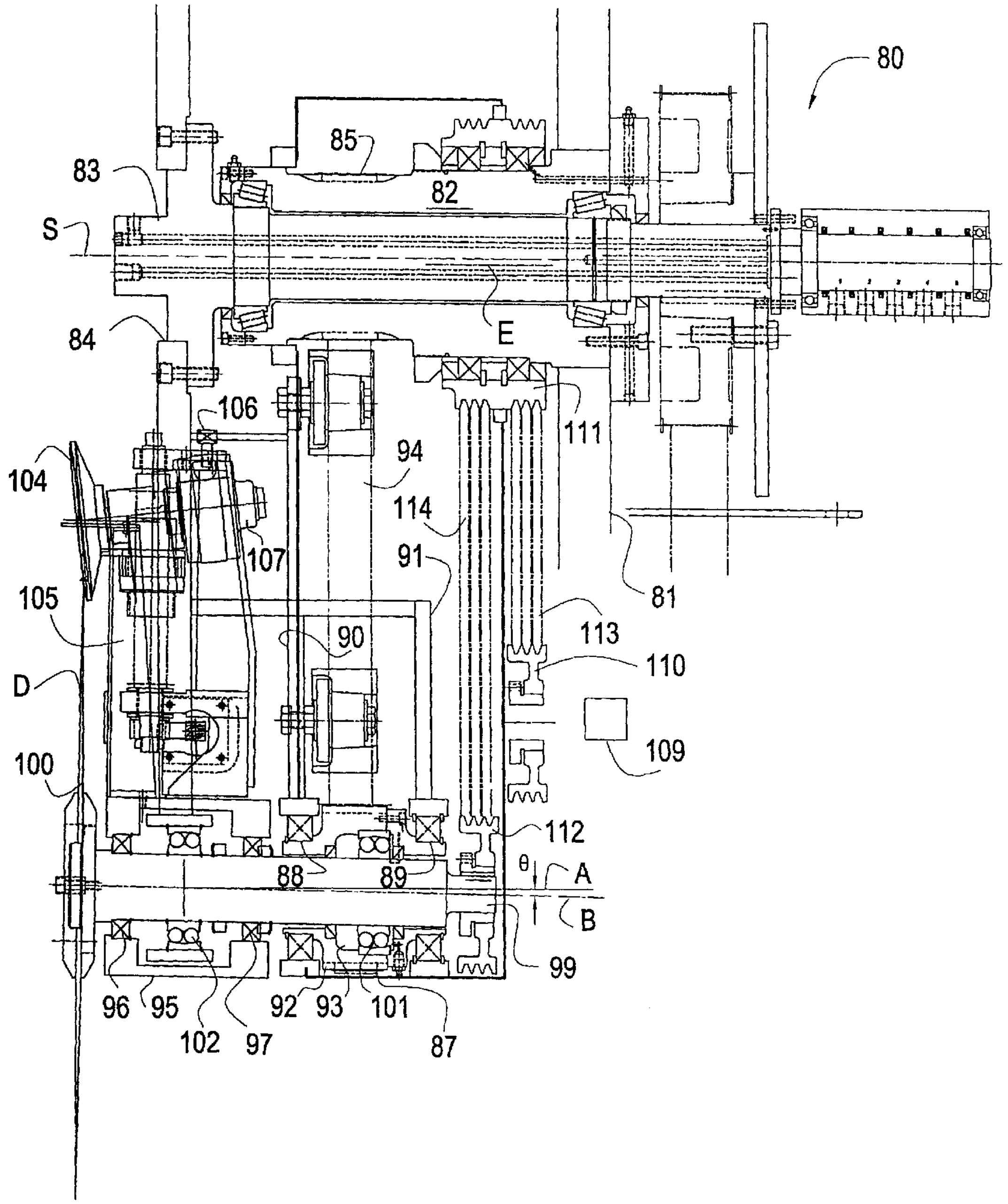
FIG. 8 is a fragmentary side elevational view of a different embodiment of a saw which is formed in accordance with the invention.

A modified embodiment of a saw 80 is illustrated in FIG. 8. The saw of FIG. 8 similarly includes a skew plate 81 which supports a main bearing housing 82. A main drive shaft 83 is rotatably mounted in the bearing housing 82 on a skew axis S and rotates a skew arm 84. The main bearing housing includes a sun pulley 85.

A planet pulley 87 is rotatably mounted on the skew arm 84 by bearings 88 and 89 which are supported by brackets 90 and 91 which are attached to the skew arm. The pitch diameter of the planet pulley defines a pitch cylinder 92 having an axis A which is parallel to the skew axis S. The planet pulley includes an inside cylindrical surface 93 parallel to the path P. The planet pulley is caused to orbit in planetary fashion by belt 94 which connects the sun pulley 85 and the planet pulley 87.

A grinder base 95 is mounted on a blade arbor 99 by bearings 96 and 97.

A blade arbor 99 and a disc blade 100 are rotatably supported by a self-aligning bearing 101 which is supported by the inside surface 93 of the planet pulley 87 and by a self-aligning wobble bearing 102 which is supported by skew arm 84. In one specific embodiment the wobble bearing was Model No. B 22600 purchased from Rexnord of Atlanta, Ga. The bearing 101 can also be a wobble bearing.

The axis of the blade arbor 99 is aligned with axis B which is parallel to the path P. Axis A and axis B intersect at a point which is centered on the wobble bearing 102. The mounting of the self-aligning bearing 101 on the inside of the planet pulley 87, in conjunction with the planetary action created by the sun and planet pulleys, compensates for the skew angle and positions the disc blade 100 perpendicular to the path P throughout the orbit. The wobble bearing 102 allows the blade to oscillate as it orbits so that the blade remains perpendicular to the path P.

A pair of grinding stones 104 is mounted on the grinder base 95 by a support arm 105. A retaining guide 106 positions and holds the grinding stones radially inwardly of the blade throughout the orbit. The grinding stones are driven by an air motor 107.

The disc blade 100 is rotated in the same manner as the disc blade of the first embodiment. A blade drive motor 109 is drivingly connected to the right end of the blade arbor 99 by a pulley 110 on the drive shaft of the motor, an eccentrically mounted pulley 111 on the main bearing housing 82, pulley 112 on the blade arbor, and belts 113 and 114.

C. FIG. 9

Figure 9:
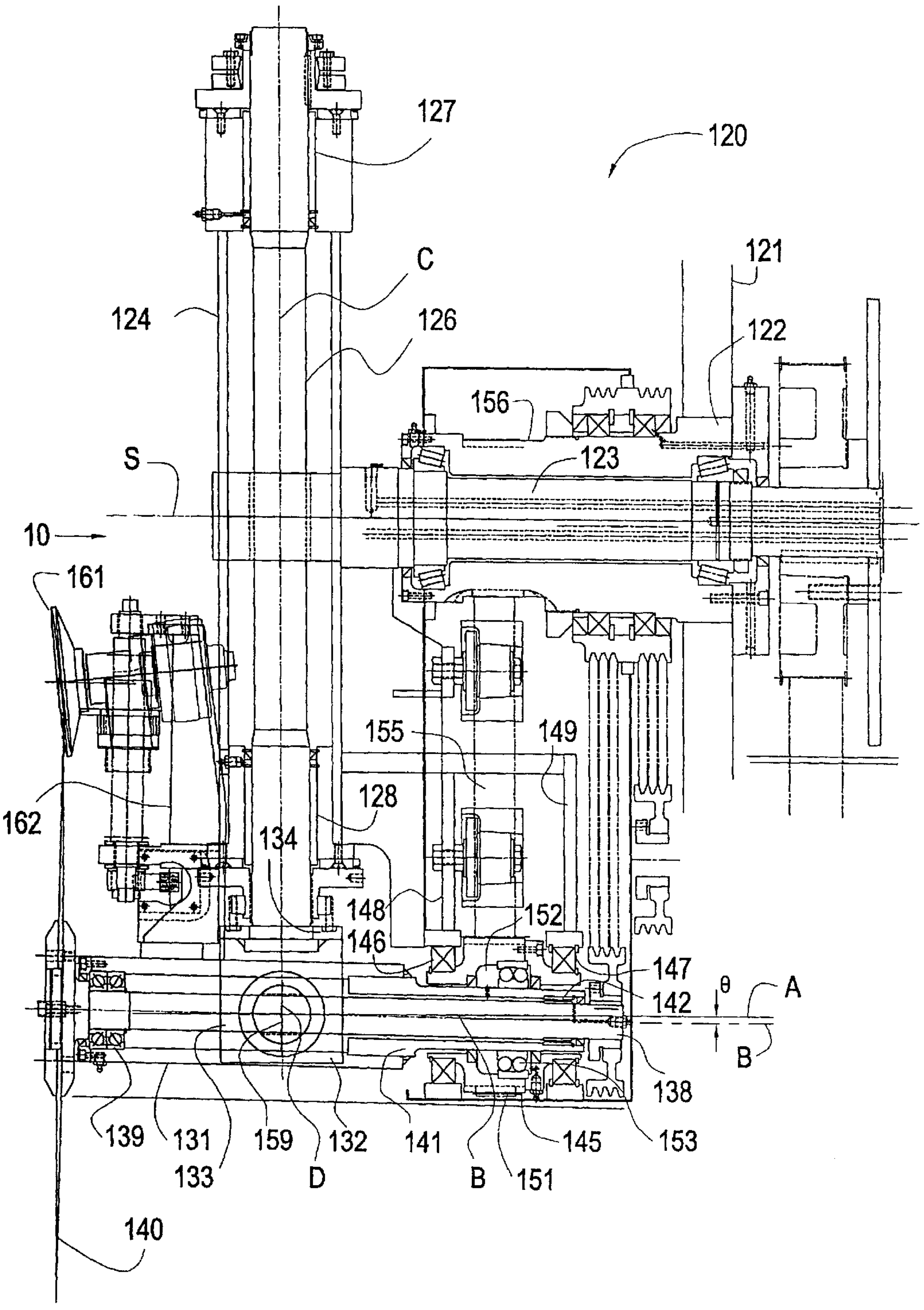
FIG. 9 is a fragmentary side elevational view of another embodiment of a saw in accordance with the invention.
Figure 10:
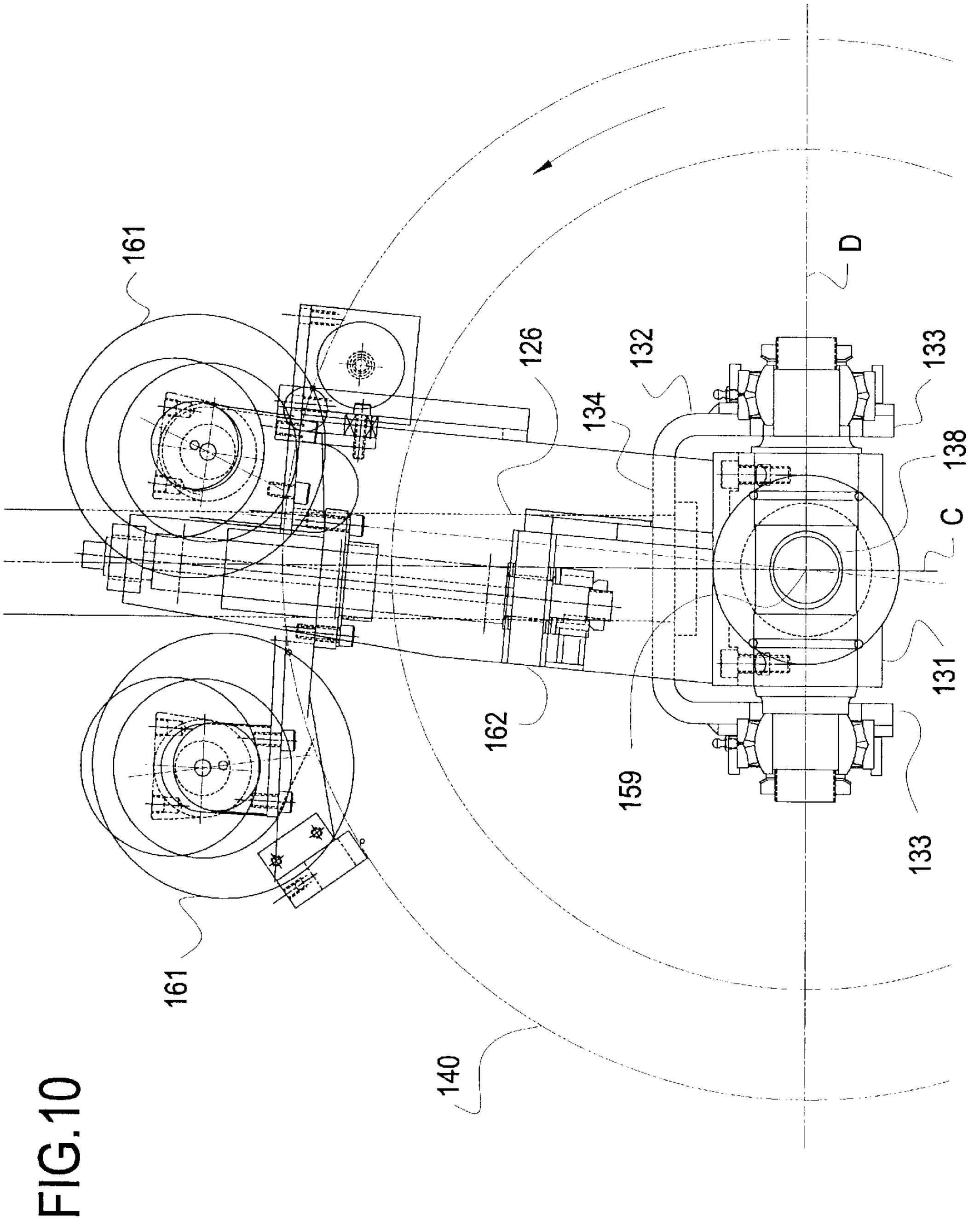
FIG. 10 is a fragmentary end view taken along the line 10—10 of FIG. 9.

A third embodiment of a saw 120 illustrated in FIG. 9 uses intersecting axes in place of the angular differentiator to compensate for the skew angle. A skew plate 121 supports a bearing housing 122 in which a main drive shaft 123 is rotatably mounted on skew axis S. Skew arm 124 is rotated by the main drive shaft 123. An elongated kingshaft 126 is rotatably mounted within the skew arm and has an axis C which extends perpendicularly to the skew axis. The ends of the kingshaft are rotatably mounted in bearings 127 and 128 which are attached to the skew arm so that the kingshaft can rotate about axis C.

A cylindrical grinder base 131 is pivotably mounted on the kingshaft by a U-shaped yoke 132 that is attached to the end of the kingshaft. The yoke includes a pair of end portions 133 which are pivotally attached to opposite sides of the grinder base 131 to form axis D and a middle portion 134 through which the kingshaft extends. The axis B of the grinder base is parallel to the path P. Axis D is perpendicular to axes B and C.

A blade arbor 138 is rotatably mounted in the grinder base 131 for rotation about axis B by a bearing 139. A disc blade 140 is attached to one end of the blade arbor and rotates perpendicularly to the path P. The right end of the blade arbor is rotatably mounted in cylindrical housing 141 by bearing 142. The housing 141 is attached to the grinder base 131.

A planet pulley 145 is rotatably mounted on the skew arm 124 by bearings 146 and 147 which are supported by brackets 148 and 149 which are attached to the skew arm. The pitch cylinder 151 of the planet pulley is concentric to axis A which is parallel to the skew axis S. Inside cylindrical surface 152 of the planet pulley is concentric to axis B to compensate for the skew angle. A self-aligning bearing 153 in the planet pulley rotatably supports the housing 141 and the right end of the blade arbor 138 on the axis B.

The planet pulley 145 is caused to orbit in planetary fashion by belt 155 which extends around the planet pulley and a sun pulley 156 on the main bearing housing 122.

The axes B, C, and D intersect at point 159 so that the disc blade remains perpendicular to the path P. Axis A intersects at point 159 for design convenience. Axis A must be positioned relative to axis B in order to position surface 152 within pitch cylinder 151.

The mounting of the self-aligning bearing 153 on the inside surface of the planet pulley, in conjunction with the planetary action created by the sun and planet pulleys, compensates for the skew angle and positions the disc blade 140 perpendicular to the path P throughout the orbit.

A pair of grinding stones 161 are mounted on the grinder base 131 by a radially inwardly extending support arm 162. The connection between the grinder base and the kingshaft 126 retains the grinding stones radially inwardly of the disc blade throughout the orbit.

In each of the embodiments the planetary motion compensates for the skew angle to keep the blade perpendicular to the path, and the grinding stones are positioned radially inwardly of the blade throughout the orbit. Centrifugal forces are reduced and cyclic loading is substantially eliminated.

All of the various embodiments can use two or more blades instead of one. A set of grinding stones is included for each blade.

While in the foregoing specification a detailed description of specific embodiments of the invention was set forth for the purpose of illustration, it will be understood that many of the details hereingiven may be varied considerably by those skilled in the art without departing from the spirit and scope of the invention.

We claim:

1. A continuous motion saw for transversely severing elongated material comprising:

a frame providing a linear path for said elongated web material, a conveyor for advancing said elongated web material along said path, a skew arm rotatably mounted on the frame for rotation about a skew axis which is skewed relative to said path, a planetary member rotatably mounted with respect to the skew arm for rotation relative to the skew arm about an axis which is parallel to the skew axis, a disc blade shaft rotatably supported by the planetary member for rotation about an axis which is parallel to said path and a disc blade mounted on the disc blade shaft for rotation therewith, the disc blade being rotatable in a plane which extends perpendicularly to said path, a grinder base mounted for rotation with the skew arm, the disc blade shaft being rotatably supported within the grinder base for rotation about an axis which is parallel to said path, a grinding stone mounted on the grinder base and positioned radially inwardly of the planetary member relative to the skew axis, and means connected to the planetary member for causing planetary orbital movement of the planetary member about the skew axis as the skew arm rotates, whereby the disc blade remains perpendicular to said path and the grinding stone remains radially inward of the planetary member as the planetary member orbits about the skew axis.

2. The saw of claim 1 including a main drive housing mounted on the frame, a main drive shaft rotatably mounted in the main drive housing for rotation about the skew axis, the main drive shaft being connected to the skew arm, a blade drive motor mounted on the frame, an intermediate drive member rotatably mounted on the main drive housing for rotation about an axis which is eccentric to the skew axis, first drive means connecting the blade drive motor to the intermediate drive member for rotating the intermediate drive member, and second drive means connecting the intermediate drive member and the disc blade shaft for rotating the disc blade shaft.

3. The saw of claim 2 in which said means for causing planetary orbital movement includes a sun pulley mounted on the main drive housing, a planet pulley on the planetary member, and a planetary drive member interconnecting the sun pulley and the planet pulley.

4. The saw of claim 1 including a main drive housing mounted on the frame, a main drive shaft rotatably mounted in the main drive housing for rotation about the skew axis, the main drive shaft being connected to the skew arm, said means for causing planetary orbital movement including a sun pulley mounted on the main drive housing, a planet pulley on the planetary member, and a planetary drive member interconnecting the sun pulley and the planet pulley.

5. The saw of claim 1 in which the planetary member comprises a cylindrical housing through which the disc blade shaft extends, a first bearing rotatably mounting the cylindrical housing in the skew arm for rotation about an axis which is parallel to the skew axis, a second bearing rotatably mounting the grinder base on the cylindrical housing for rotation about an axis which is parallel to said path, and a third bearing rotatably supporting the disc blade shaft in the grinder base for rotation about an axis which is parallel to said path.

6. The saw of claim 5 including a main drive housing mounted on the frame, a main drive shaft rotatably mounted in the main drive housing for rotation about the skew axis, the main drive shaft being connected to the skew arm, a blade drive motor mounted on the frame, an intermediate drive member rotatably mounted on the main drive housing for rotation about an axis which is eccentric to the skew axis, first drive means connecting the blade drive motor to the intermediate drive member for rotating the intermediate drive member, and second drive means connecting the intermediate drive member and the disc blade shaft for rotating the disc blade shaft.

7. The saw of claim 5 including a main drive housing mounted on the frame, a main drive shaft rotatably mounted in the main drive housing for rotation about the skew axis, the main drive shaft being connected to the skew arm, said means for causing planetary orbital movement including a sun pulley mounted on the main drive housing, a planet pulley on the planetary member, and a planetary drive member interconnecting the sun pulley and the planet pulley.

8. The saw of claim 1 in which said planetary member comprises a planet pulley having a pitch cylinder which is concentric to an axis which is parallel to the skew axis, said disc blade shaft being rotatably mounted within the inside cylindrical surface, and a bearing rotatably mounting the disc blade shaft so that the disc blade shaft is aligned with an axis which is parallel to said path.

9. The saw of claim 8 including a main drive housing mounted on the frame, a main drive shaft rotatably mounted in the main drive housing for rotation about the skew axis, the main drive shaft being connected to the skew arm, a blade drive motor mounted on the frame, an intermediate drive member rotatably mounted on the main drive housing for rotation about an axis which is eccentric to the skew axis, first drive means connecting the blade drive motor to the intermediate drive member for rotating the intermediate drive member, and second drive means connecting the intermediate drive member and the disc blade shaft for rotating the disc blade shaft.

10. The saw of claim 1 in which said planetary member comprises a planet pulley having a cylindrical pitch surface which is concentric to an axis which is parallel to the skew axis, the saw including a kingshaft which extends perpendicularly to the skew axis and which is rotatably mounted to the skew arm for rotation about an axis which extends perpendicularly to the skew axis, said grinder base being pivotably mounted on the kingshaft, said disc blade shaft being rotatably mounted within said grinder base for rotation about an axis which is parallel to said path.

11. The saw of claim 10 including a main drive housing mounted on the frame, a main drive shaft rotatably mounted in the main drive housing for rotation about the skew axis, the main drive shaft being connected to the skew arm, a blade drive motor mounted on the frame, an intermediate drive member rotatably mounted on the main drive housing for rotation about an axis which is eccentric to the skew axis, first drive means connecting the blade drive motor to the intermediate drive member for rotating the intermediate drive member, and second drive means connecting the intermediate drive member and the disc blade shaft for rotating the disc blade shaft.

* * * * *